United States Patent
Tjio et al.

(10) Patent No.: US 8,910,217 B2
(45) Date of Patent: Dec. 9, 2014

(54) BROADCAST VIDEO PROVISIONING SYSTEM

(75) Inventors: Lee Tjio, Danville, CA (US); Sergio Aguirre, Southlake, TX (US); Brett I. Rogers, Bethlehem, PA (US); David Chiang, Fremont, CA (US); Derek Hongwei H. Bao, Concord, CA (US); David M. Alward, Danville, CA (US); Vijay T. Madhav, Walnut Creek, CA (US); Lalit R. Kotecha, San Ramon, CA (US); Arvind Basra, Glen Ridge, NJ (US)

(73) Assignees: Verizon Patent and Licensing Inc., Basking Ridge, NJ (US); Cellco Partnership, Basking Ridge, NJ (US)

(*) Notice: Subject to any disclaimer, the term of this patent is extended or adjusted under 35 U.S.C. 154(b) by 203 days.

(21) Appl. No.: 13/280,816

(22) Filed: Oct. 25, 2011

(65) Prior Publication Data
US 2013/0104173 A1 Apr. 25, 2013

(51) Int. Cl.
| | | |
|---|---|---|
| H04W 4/00 | (2009.01) | |
| H04H 20/55 | (2008.01) | |
| H04W 4/02 | (2009.01) | |
| H04N 21/61 | (2011.01) | |
| H04N 21/266 | (2011.01) | |
| H04N 21/258 | (2011.01) | |
| H04N 21/2187 | (2011.01) | |

(52) U.S. Cl.
CPC ........... *H04N 21/2187* (2013.01); *H04H 20/55* (2013.01); *H04W 4/021* (2013.01); *H04N 21/6131* (2013.01); *H04N 21/26616* (2013.01); *H04N 21/25841* (2013.01)

USPC ............................................ 725/62; 370/329

(58) Field of Classification Search
CPC .................... H04N 21/6131; H04N 21/41407; H04N 21/2187; H04N 21/25841; H04N 21/26616; H04H 20/55; H04W 4/021
USPC ............................. 455/3.06; 725/62; 370/329
See application file for complete search history.

(56) References Cited

U.S. PATENT DOCUMENTS

| | | | |
|---|---|---|---|
| 7,590,992 B2* | 9/2009 | Koplar et al. ................... 725/23 |
| 8,069,010 B2* | 11/2011 | Choi et al. ..................... 702/179 |
| 8,171,032 B2* | 5/2012 | Herz ............................... 707/748 |
| 2002/0123928 A1* | 9/2002 | Eldering et al. ................ 705/14 |
| 2003/0208754 A1* | 11/2003 | Sridhar et al. .................. 725/34 |
| 2004/0128688 A1* | 7/2004 | Seo ................................. 725/62 |
| 2005/0210512 A1* | 9/2005 | Anderson et al. .............. 725/62 |
| 2007/0018952 A1* | 1/2007 | Arseneau et al. ............. 345/156 |
| 2007/0294674 A1* | 12/2007 | Marilly et al. ................ 717/136 |
| 2009/0150943 A1* | 6/2009 | Vasudevan et al. ............ 725/86 |
| 2009/0183207 A1* | 7/2009 | Patel et al. ...................... 725/58 |
| 2009/0193485 A1* | 7/2009 | Rieger et al. .................. 725/114 |
| 2010/0030637 A1* | 2/2010 | Koplar ........................ 705/14.39 |
| 2010/0057560 A1* | 3/2010 | Skudlark et al. ........... 705/14.49 |
| 2010/0075685 A1* | 3/2010 | Axnas ........................... 455/450 |

(Continued)

*Primary Examiner* — Nasser Goodarzi
*Assistant Examiner* — Michael B Pierorazio

(57) ABSTRACT

A device receives, from a network device, information associated with an event, and assigns an event identifier to the event based on the event information. The device also provides the event identifier to a cell control device located at a location associated with the event, and determines a cell capacity of the location to ensure that there is sufficient cell capacity at the location to broadcast the event. The network device instructs a device capturing the event to provide live event data to the cell control device for a predetermined time period.

22 Claims, 17 Drawing Sheets

(56) References Cited

U.S. PATENT DOCUMENTS

| | | | |
|---|---|---|---|
| 2010/0077441 A1* | 3/2010 | Thomas et al. | 725/133 |
| 2010/0161756 A1* | 6/2010 | Lewis et al. | 709/217 |
| 2010/0192212 A1* | 7/2010 | Raleigh | 726/7 |
| 2010/0254295 A1* | 10/2010 | Ahn et al. | 370/312 |
| 2010/0303100 A1* | 12/2010 | Niamut et al. | 370/503 |
| 2011/0082807 A1* | 4/2011 | Parekh et al. | 705/319 |
| 2011/0103308 A1* | 5/2011 | Lee et al. | 370/328 |
| 2011/0145846 A1* | 6/2011 | Kim | 725/5 |
| 2011/0283329 A1* | 11/2011 | Davis et al. | 725/62 |
| 2012/0020307 A1* | 1/2012 | Henderson et al. | 370/329 |
| 2012/0079541 A1* | 3/2012 | Pan | 725/62 |
| 2012/0191815 A1* | 7/2012 | Tabbal et al. | 709/218 |
| 2012/0233646 A1* | 9/2012 | Coniglio et al. | 725/78 |
| 2012/0240167 A1* | 9/2012 | Vasudevan et al. | 725/62 |
| 2012/0263089 A1* | 10/2012 | Gupta et al. | 370/312 |
| 2013/0007814 A1* | 1/2013 | Cherian et al. | 725/62 |
| 2013/0104173 A1* | 4/2013 | Tjio et al. | 725/62 |
| 2013/0111520 A1* | 5/2013 | Lo et al. | 725/35 |
| 2013/0211567 A1* | 8/2013 | Oganesyan et al. | 700/94 |
| 2013/0276035 A1* | 10/2013 | WALKER et al. | 725/62 |
| 2013/0290555 A1* | 10/2013 | Einarsson et al. | 709/231 |

* cited by examiner

FIG. 6

| Event ID 610 | Event Title 620 | Duration 630 | Location 640 | Start Time 650 | Stop Time 660 | Type 670 |
|---|---|---|---|---|---|---|
| 1 | Football | 3 hours | Camden | 1:00 PM | 4:00 PM | Live |
| 2 | Movie | 2 hours | N/A | On demand | --- | Recorded |
| 3 | Concert | 4 hours | NYC | 7:00 PM | 11:00 PM | Live |
| *** | *** | *** | *** | *** | *** | *** |

| Service Area Name | Service Area ID | Cell ID | Location | Distributed Network | TMGIs |
|---|---|---|---|---|---|
| NYC | 189 | 806 | 40.77.73.98 | Yes | 124977 |
| Long Island | 462 | 537 | 40.73.73.43 | Yes | 115928 |
| Regional_NW | 447 | 390 | *** | Yes | 193936 |
| Regional_SW | 603 | 242 | *** | Yes | 103777 |
| Regional_Central | 306 | 446 | *** | Yes | 514167 |
| Regional_NE | 592 | 451 | *** | Yes | 360988 |
| Regional_SE | 406 | 917 | *** | Yes | 445896 |
| Stadium (pico) | 576 | 904 | *** | No | 131622 |
| National | 387 | 672 | *** | Yes | 157157 |

FIG. 15

| MBSFN_NAME | MBSFN_ID | % Subframes | MCS Value | FEC Value | GBR | Max Video BW | Overrides |
|---|---|---|---|---|---|---|---|
| Natl-Urban-500k | 50 | 30% | 8 | 15% | 20% | 250 | NO |
| Natl-Urban-300k | 75 | 30% | 8 | 15% | 20% | 150 | NO |
| Natl-Rural-300k | 18 | 30% | 4 | 20% | 20% | 150 | NO |
| Natl-Rural-200k | 26 | 30% | 4 | 15% | 20% | 0 | YES |
| Venue-8000k | 59 | 40% | 8 | 5% | 10% | 8000 | YES |

FIG. 16

| File Name | Content ID | URI | ASP Name | Source I/F | Encode | Bit Rate | UDP |
|---|---|---|---|---|---|---|---|
| Football Game | 89127 | /xx/tv/live.mpd | NFL | PUSH | H.264 | 600 Kbps | 232.0.0.0 |
| Charge 5.1.1 | 50367 | /charge_5.1.1/ | Phone | PULL | - | - | - |
| Content 1 | 97754 | *** | *** | *** | *** | *** | *** |
| Content 2 | 61077 | *** | *** | *** | *** | *** | *** |
| Content 3 | 42698 | *** | *** | *** | *** | *** | *** |

BROADCAST VIDEO PROVISIONING SYSTEM

BACKGROUND

Evolved multimedia broadcast multicast services (eM-BMS) include a point-to-multipoint (PMP) interface specification for existing and upcoming Third Generation Partnership Project (3GPP) cellular networks. eMBMS are designed to provide efficient delivery of broadcast and multicast services, both within a cell as well as within a core network. For broadcast transmission across multiple cells, it defines transmission via single-frequency network configurations. Target applications, for eMBMS, include mobile television (TV) and radio broadcasting, as well as file delivery and emergency alerts. However, the 3GPP has yet to define how to provision small cells (e.g., provided by eNodeBs (eNBs)), provided at a particular location, such as a stadium, a concert hall, etc., for eMBMS.

BRIEF DESCRIPTION OF THE DRAWINGS

FIG. 6 is a diagram of a portion of an example database capable of being provided in and/or managed by a broadcast video provisioning system (BVPS) of FIG. 1;

FIG. 14 is a diagram of a portion of an example service area template capable of being provided in and/or managed by the BVPS of FIG. 1;

FIG. 15 is a diagram of a portion of an example network template capable of being provided in and/or managed by the BVPS of FIG. 1;

FIG. 16 is a diagram of a portion of an example content template capable of being provided in and/or managed by the BVPS of FIG. 1.

DETAILED DESCRIPTION OF PREFERRED EMBODIMENTS

Figure 1:
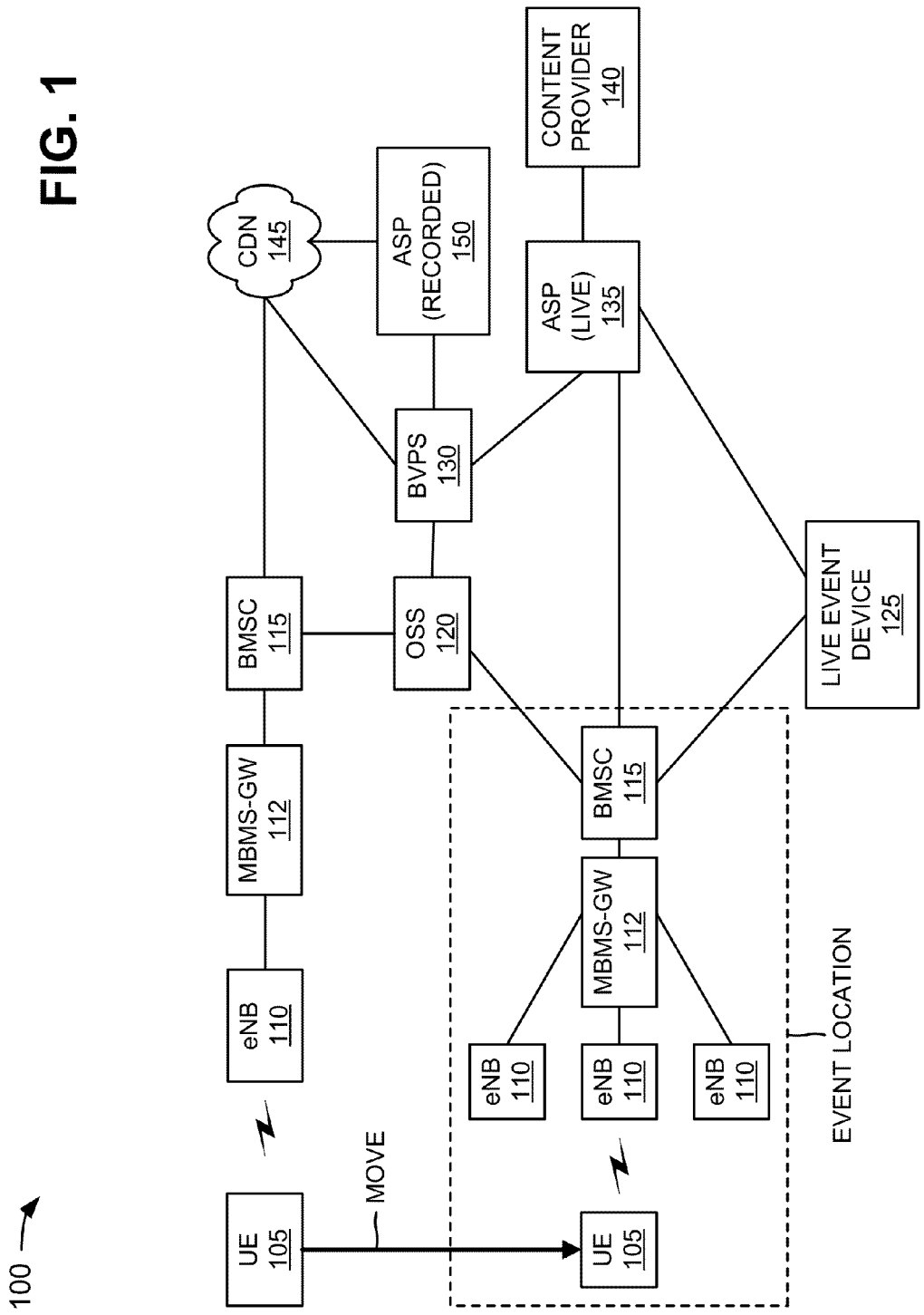
FIG. 1 is a diagram of an example network in which systems and/or methods described herein may be implemented.

The following detailed description refers to the accompanying drawings. The same reference numbers in different drawings may identify the same or similar elements.

Systems and/or methods described herein may provide a network device that provisions small cells for eMBMS, such as video broadcast multicast services. This may be achieved by dynamically configuring an access network to an eMBMS single frequency network (MBSFN), where the multiple small cells broadcast the same information with network known parameters, schedule, and service area for content delivery. The small cells may be reserved on an opportunistic basis, such as when an event is about to occur, and may be reserved for a specified period of time, such as the duration of the event. Once the event is over, the systems and/or methods may provision the small cells for unicast service. The event may include a regional event, a national event, a live event, a recorded event, data delivery, etc. The systems and/or methods may provision small cells for eMBMS across multiple regions, and may provision different small cells with different bandwidth feeds for eMBMS.

Unique customers accessing popular content, such as video and software updates, may consume such content via unicast and may create multiple instances of the same content in a network. This may not be desirable due to network resources being inefficiently allocated for point-to-point traffic. The systems and/or methods may be able to broadcast such content on a controlled channel, which may permit customers to access the content with no difference in customer experience while conserving network resources via delivery over eMBMS.

In one example implementation, the network device may receive, from an application service provider device, information associated with an event, such as a title, a duration, a location, a start time, a stop time, etc. associated with the event. The network device may assign an event identifier to the event based on the event information, and may provide the event identifier to a cell control device at a location associated with the event. The network device may determine cell capacity of the location based on, for example, availabilities and capacities of devices generating the cell coverage. The application service provider device may instruct a device capturing the event to provide live data from the event to the cell control device for a predetermined time period. The cell control device may broadcast the live data to UEs, at the location, that request the live data, and may terminate the broadcast of the live data after expiration of the predetermined time period.

As used herein, the terms "subscriber" and/or "user" may be used interchangeably. Also, the terms "subscriber" and/or "user" are intended to be broadly interpreted to include a UE, or a user of a UE.

The term "component," as used herein, is intended to be broadly construed to include hardware (e.g., a processor, a microprocessor, an application-specific integrated circuit (ASIC), a field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

The terms "small cell" and/or "eNB," as used herein, may be used interchangeably. Also, the terms "small cell" and/or "eNB" are intended to be broadly construed to include a microcell, a picocell, a femtocell, a pico eNB, etc.

FIG. 1 is a diagram of an example network 100 in which systems and/or methods described herein may be implemented. As illustrated, network 100 may include a UE 105, multiple eNBs 110, multiple multimedia broadcast multicast services gateways (MBMS-GWs) 112, multiple broadcast multicast service controls (BMSCs) 115, an operations support system (OSS) 120, a live event device 125, a broadcast video provisioning system (BVPS) 130, a live application service provider (ASP) 135, a content provider 140, a content delivery network (CDN) 145, and a recorded ASP 150. Devices and/or networks of network 100 may interconnect via wired and/or wireless connections. For example, UE 105 may wirelessly interconnect with one or more eNBs 110. Two UEs 105, four eNBs 110, two MBMS-GWs 112, two BMSCs 115, one OSS 120, one live event device 125, one BVPS 130, one live ASP 135, one content provider 140, one CDN 145, and one recorded ASP 150 have been illustrated in FIG. 1 for simplicity. In practice, there may be more UEs 105, eNBs 110, MBMS-GWs 112, BMSCs 115, OSSs 120, live event devices 125, BVPSs 130, live ASPs 135, content providers 140, CDNs 145, and recorded ASPs 150 than depicted in FIG. 1.

As further shown in FIG. 1, three eNBs 110 and one BMSC 115 may be provided at an event location, such as a stadium, a concert hall, a school, an auditorium, etc. The event may include a regional event, a national event, a live event, a recorded event, data delivery, etc. For example, the event may include a sporting event, a concert, a live speech, a movie, a live news feed, a pop culture event, or another event that may be provided as multimedia to UE 105. At some point in time a user of UE 105 may move to a location within the event location. For example, the user of UE 105 may enter a stadium where a football game is to be played.

UE 105 may include a radiotelephone; a personal communications system (PCS) terminal that may combine, for example, a cellular radiotelephone with data processing and data communications capabilities; a smart phone; a personal digital assistant (PDA) that can include a radiotelephone, a pager, Internet/intranet access, etc.; a laptop computer; a tablet computer; or other types of computation and/or communication devices. In one example, UE 105 may include a device that is capable of communicating with BMSC 115 via eNB 110.

eNB 110 may include one or more computation and/or communication devices that receive multimedia (e.g., video, voice, data, etc.) from BMSC 115 and/or BVPS 130 and wirelessly transmit that multimedia to UE 105. eNB 110 may also include one or more devices that wirelessly receive information (e.g., video, voice, data, etc.) from UE 105 and transmit that information to BMSC 115, BVPS 130, and/or to other UEs 105. eNB 110 may combine the functionalities of a base station and a radio network controller (RNC) in second generation (2G) or third generation (3G) radio access networks.

MBMS-GW 112 may include one or more computation and/or communication devices, that gather, process, and/or provide information in a manner described herein. For example, MBMS-GW 112 may include a server device, a workstation computer, a network device, etc. In an example implementation, MBMS-GW 112 may include a point-to-multipoint interface that provides delivery of broadcast and multicast services within a cell and within a core network. For broadcast transmission across multiple cells, MBMS-GW 112 may define transmission via single-frequency network configurations.

BMSC 115 may include one or more computation and/or communication devices, that gather, process, and/or provide information in a manner described herein. For example, BMSC 115 may include a server device, a workstation computer, a network device, etc. In an example implementation, BMSC 115 may reserve bandwidth at the event location (e.g., at the three eNBs 110 at the event location) before the event begins, and may receive live data (e.g., multimedia) from live event device 125 when the event begins. BMSC 115 may broadcast the live data to UE 105, at the event location, when UE 105 requests the live data, and may terminate the broadcast of the live data after a predetermined time period (e.g., after the event ends). BMSC 115 may include a SGmb interface for control plane with MBMS-GW 112; a SGi-mb interface for user plane with MBMS-GW 112; a web services-based provisioning interface with BVPS 130; a notification interface with BVPS 130; file ingestion interfaces; etc.

OSS 120 may include one or more server entities, or other types of computation and/or communication devices, that gather, process, and/or provide information in a manner described herein. For example, OSS 120 may include one or more servers (or systems) used by telecommunications service providers that support processes, such as maintaining network inventory, provisioning services, configuring network components, managing faults, dealing with customers, supporting processes such as taking orders, processing bills, collecting payments, etc.

Live event device 125 may include one or more devices that capture the event in real time, and broadcast live data of the captured event to other devices. For example, live event device 125 may include one or more video cameras, audio equipment, microphones, etc. that capture the event in real time, and broadcast the captured multimedia (e.g., video, audio, data, etc.), in real time, to one or more subscribers of the event, to television stations, to radio stations, etc. If the event were a live rock concert, live event device 125 may capture the rock concert in real time, and may broadcast the rock concert to one or more television stations, radio stations, etc. In one example implementation, live event device 125 may include a computer system, an application, a cable headend, and/or a broadcasting device capable of providing multimedia in a variety of formats, commercials, advertisements, instructions, and/or other information. Alternatively, or additionally, live event device 125 may capture the event in real time, and may record the captured multimedia for broadcasting at a later time. Live event device 125 may be located within and/or outside of the event location.

BVPS 130 may include one or more computation and/or communication devices, that gather, process, and/or provide information in a manner described herein. For example, BVPS 130 may include a server device, a workstation computer, a network device, etc. In an example implementation, BVPS 130 may receive information associated with the event, and may assign an event identifier to the event based on the event information. BVPS 130 may provide the event identifier to BMSC 115 located at the event location, and may determine cell capacity of eNBs 110 located at the event location. Live event device 125 may capture and broadcast the live event data to BMSC 115 based on the event information. BMSC 115 may broadcast the live event data to UE 105, at the event location, when UE 105 requests the live event data. BVPS 130 may include a centralized system that is responsible for communicating eMBMS session information with BMSC 115, ASPs 135/150, network management systems (NMSs), OSS 120, etc. BVPS 130 may utilize appropriate interfaces and parameters to seamlessly create broadcast sessions with minimal impact to network traffic and while optimizing customers' quality of experience.

Live ASP 135 may include one or more computation and/or communication devices, that gather, process, and/or provide information in a manner described herein. For example, live ASP 135 may include one or more computation and/or communication devices that provide a service, such as live multimedia broadcasts, to subscribers (e.g., UE 105) over a network, such as network 100. In one example implementation, live ASP 135 may provide information associated with the event to BVPS 130, and may instruct live event device 125 to provide the live event data to BMSC 115 for a predetermined time period (e.g., while a football game is being played).

Content provider 140 may include one or more server devices, or other types of computation and/or communication devices, that gather, process, and/or provide information in a manner described herein. In one example, content provider 140 may include a computer system, an application, a cable head-end, a data warehouse, and/or a broadcasting device capable of providing video content (e.g., video on demand (VOD) content, high definition (HD)-VOD content, television programming, movies, on-demand services, live television, etc.) in a variety of formats; audio content in a variety of formats; commercials; advertisements; instructions; recommendations; promotions; web-based content (e.g., streaming content from web sites); and/or other information. In one example implementation, content provider 140 may provide content to live ASP 135 for provision to subscribers (e.g., UE 105).

CDN 145 may include one or more server devices, or other types of computation and/or communication devices, that gather, process, and/or provide information in a manner described herein. In one example implementation, CDN 145 may include a computer system, applications, a cable head-end, and/or broadcasting devices capable of providing streaming video content, commercials, advertisements, instructions, applications, over-the-air (OTA) upgrades, machine-to-machine (M2M) software, and/or other information to UE 105 via, for example, eNB 110, BMSC 115, and BVPS 130.

Recorded ASP 150 may include one or more computation and/or communication devices, that gather, process, and/or provide information in a manner described herein. For example, recorded ASP 150 may include one or more computation and/or communication devices that provide a service, such as recorded multimedia broadcasts, to subscribers (e.g., UE 105) over a network, such as network 100. In one example implementation, recorded ASP 150 may provide information associated with a recorded event to BVPS 130, and may provide recorded event data to BVPS 130 when requested by UE 105. BVPS 130 may provide the recorded event data to UE 105 via eNB 110 and BMSC 115.

Although FIG. 1 shows example devices/networks of network 100, in other implementations, network 100 may include fewer devices/networks, different devices/networks, differently arranged devices/networks, or additional devices/networks than depicted in FIG. 1. Alternatively, or additionally, one or more devices/networks of network 100 may perform one or more other tasks described as being performed by one or more other devices/networks of network 100.

Figure 2:
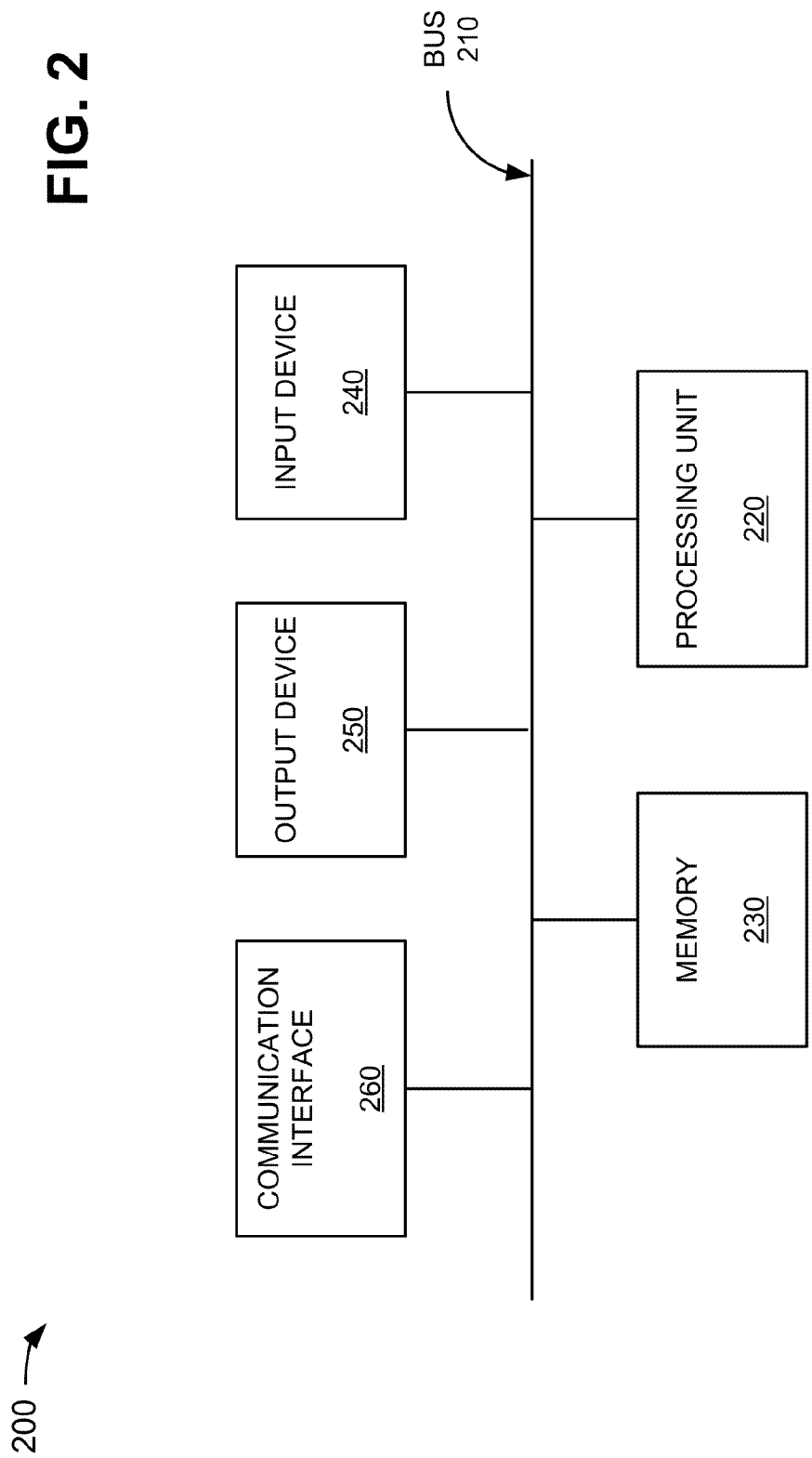
FIG. 2 is a diagram of example components of a device that may correspond to one of the devices of the network depicted in FIG. 1.

FIG. 2 is a diagram of example components of a device 200 that may correspond to one of the devices of network 100. In one example implementation, one or more of the devices of network 100 may include one or more devices 200 or one or more components of device 200. As illustrated in FIG. 2, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more ASICs, FPGAs, or the like.

Memory 230 may include a RAM or another type of dynamic storage device that stores information and instructions for execution by processing unit 220, a ROM or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, a touch screen display, one or more biometric mechanisms, and the like. Output device 250 may include a device that outputs information to the operator, such as a display, a speaker, etc.

Communication interface 260 may include any transceiver-like mechanism that enables device 200 to communicate with other devices and/or systems. For example, communication interface 260 may include mechanisms for communicating with other devices, such as other devices of network 100.

As described herein, device 200 may perform certain operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, or additionally, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

Figure 3:
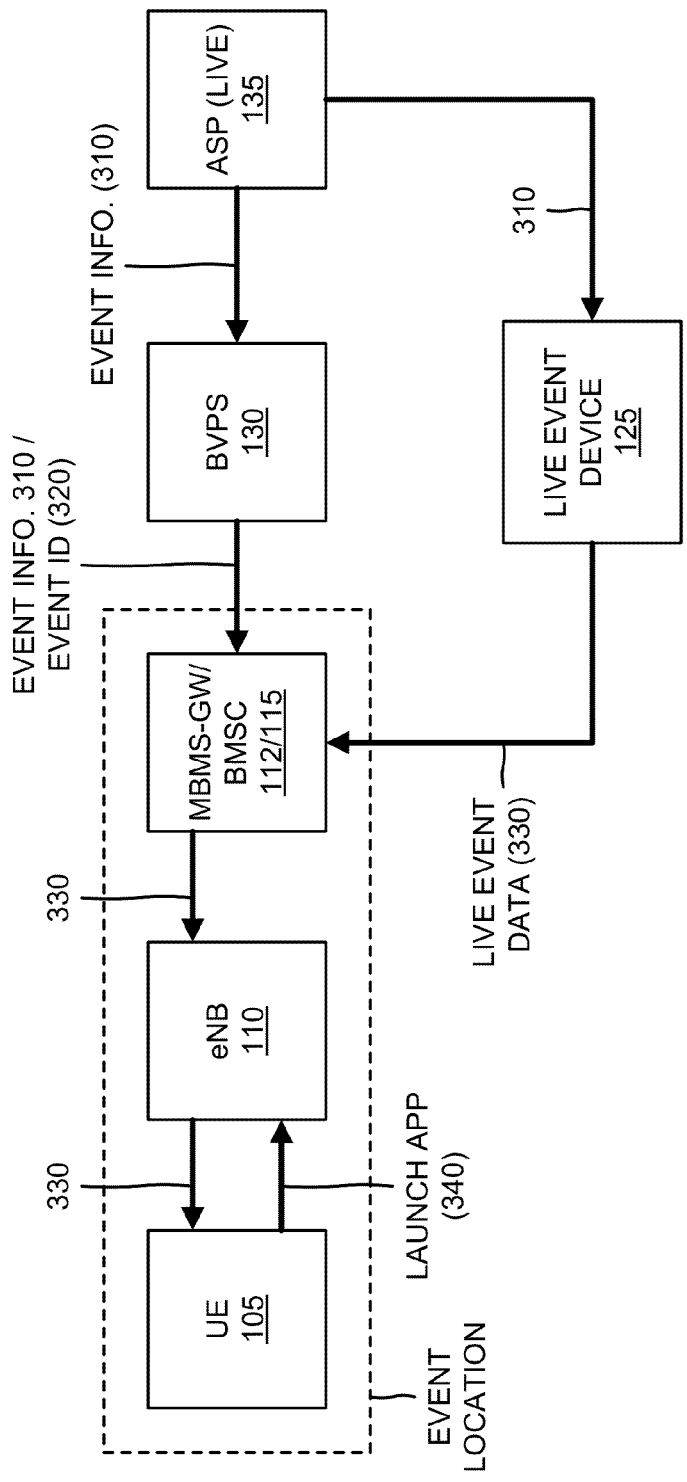
FIG. 3 is a diagram of example live event operations capable of being performed by an example portion of the network in FIG. 1.

FIG. 3 is a diagram of example live event operations capable of being performed by an example portion 300 of network 100 (FIG. 1). As shown, network portion 300 may include UE 105 (in an event location), eNB 110 (in the event location), MBMS-GW 112/BMSC 115 (in the event location), live event device 125, BVPS 130, and live ASP 135. UE 105, eNB 110, MBMS-GW 112/BMSC 115, live event device 125, BVPS 130, and live ASP 135 may include the features described above in connection with, for example, one or more of FIGS. 1 and 2.

As further shown in FIG. 3, when an event is scheduled, live ASP 135 may provide event information 310 to BVPS 130 for provisioning eNB 110 and MBMS-GW 112/BMSC 115 for a broadcast of the event. Event information 310 may include a title of the event, a duration of the event, a location of the event, a start time of the event, a stop time of the event, whether the event is live or recorded, and/or other information. For example, if the event is a pro football game, event information 310 may include "New York vs. Philadelphia" as a title, "3 hours" as a duration, "Philadelphia Stadium" as a location, "1:00 PM" as a start time, "4:00 PM" as a stop time, etc. Live ASP 135 may also provide event information 310 to live event device 125. Event information 310 may instruct live event device 125 to provide live event data to MBMS-GW 112/BMSC 115 when the event begins and for a predetermined time period (e.g., the duration of the event).

BVPS 130 may receive event information 310, and may assign an event identifier (ID) 320 to the event based on event information 310. BVPS 130 may store event ID 320 and corresponding event information 310 in a database associated with BVPS 130. The database may include information associated with all events to be broadcast by network 100 (FIG. 1). BVPS 130 may provide event ID 320 and the corresponding event information 310 to MBMS-GW 112/BMSC 115, and may determine a cell capacity of eNB 110 at the event location. In one example, BVPS 130 may determine the cell capacity of eNB 110 to ensure that there is sufficient cell capacity to broadcast the event to eNB 110.

MBMS-GW 112/BMSC 115 may receive event ID 320 and the corresponding event information 310 from BVPS 130, and may identify when the event begins based on event information 310. Based on event information 310, MBMS-GW 112/BMSC 115 may reserve bandwidth at the event location (e.g., at eNB 110) before the event begins. For example, MBMS-GW 112/BMSC 115 may instruct eNB 110 to reserve bandwidth in preparation for the beginning of the event. When the event begins, live event device 125 may capture and broadcast live event data 330 to MBMS-GW 112/BMSC 115 based on event information 310. Live event data 330 may include multimedia (e.g., video, audio, data, etc.) captured by live event device 125 at the event location. MBMS-GW 112/BMSC 115, in turn, may broadcast live event data 330 to eNBs 110 provided at the event location.

A user of UE 105 may launch an application 340 (e.g., provided on UE 105) that enables UE 105 to request and receive live event data 330 when UE 105 is located within the event location. UE 105, via application 340, may request live event data 330 from eNB 110, and eNB 110 may provide live event data 330 to UE 105 based on the request. In one example, the user may launch application 340, and may move to a location within the event location. When UE 105 detects that UE 105 is located within a broadcast system of the event location, application 340 may display "live event" information on UE 105 to indicate that live event data 330 is available. The user (via UE 105) may select the "live event" information, and UE 105 may receive and display live event data 330 to the user. In one example implementation, MBMS-GW 112/BMSC 115 may broadcast live event data 330 to UE 105 for a predetermined time period (e.g., the duration of the live event), and may terminate the broadcast of live event data 330 after the predetermined time period.

Although FIG. 3 shows example components of network portion 300, in other implementations, network portion 300 may include fewer components, different components, differently arranged components, or additional components than depicted in FIG. 3. Additionally, or alternatively, one or more components of network portion 300 may perform one or more other tasks described as being performed by one or more other components of network portion 300.

Figure 4:
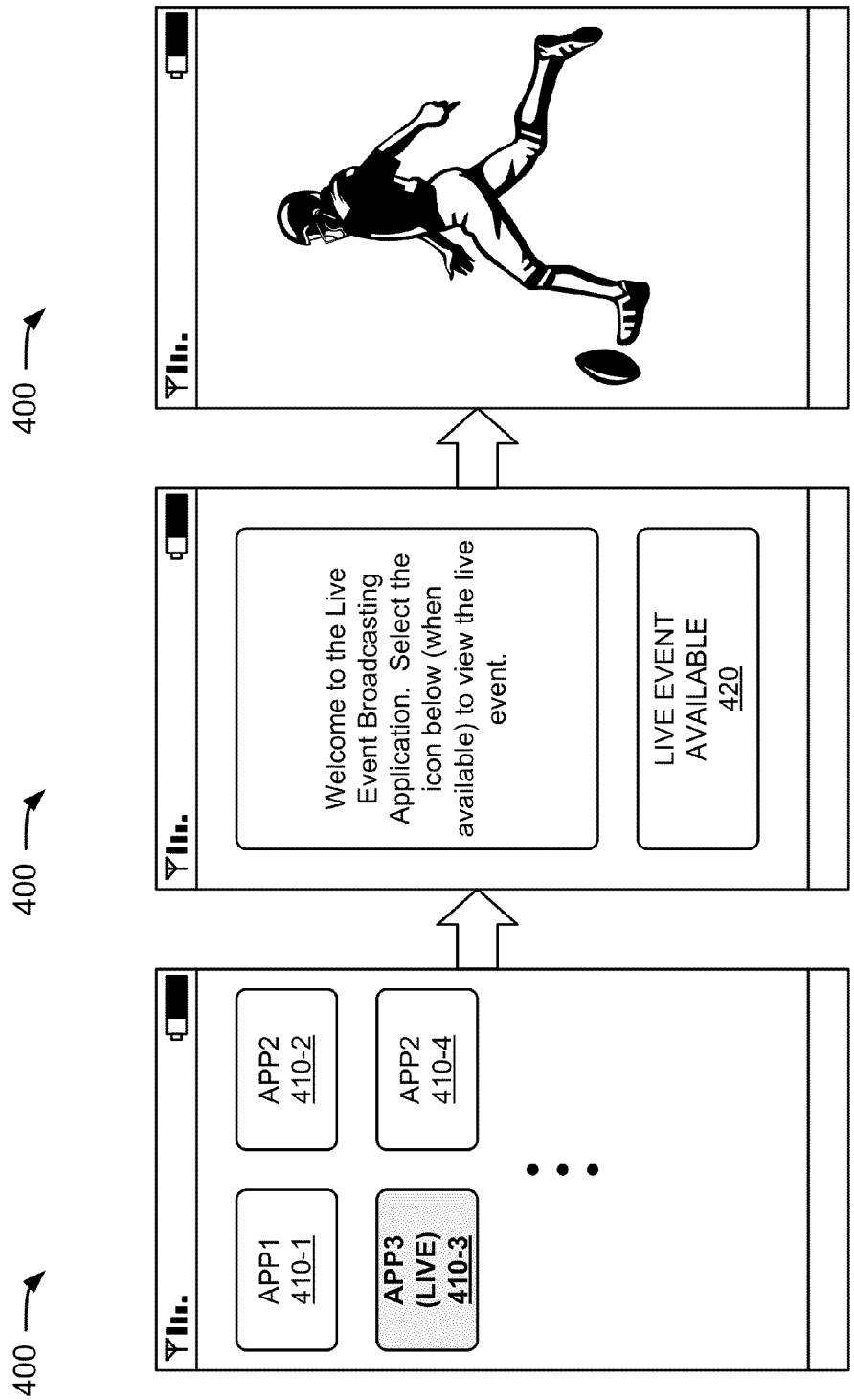
FIGS. 4A-4C are diagrams of example user interfaces capable of being provided by a user equipment (UE) of FIG. 1.

FIGS. 4A-4C are diagrams of example user interfaces 400 capable of being provided by UE 105. User interfaces 400 may include graphical user interfaces (GUIs) or non-graphical user interfaces, such as text-based interfaces. User interfaces 400 may provide information to users via customized interfaces (e.g., proprietary interfaces) and/or other types of interfaces (e.g., browser-based interfaces, etc.). User interfaces 400 may receive user inputs via one or more input devices (e.g., input device 240, FIG. 2), may be user-configurable (e.g., a user may change the size of user interfaces 400, information displayed in user interfaces 400, color schemes used by user interfaces 400, positions of text, images, icons, windows, etc., in user interfaces 400, etc.), and/or may not be user-configurable. Information associated with user interfaces 400 may be selected and/or manipulated by a user of UE 105 (e.g., via a touch screen display, control buttons, and/or a keypad).

As shown in FIG. 4A, user interface 400 may present various applications to a user, such as an email application 410-1, a telephone application 410-2, a live event broadcasting application 410-3, a text messaging application 410-4, etc. Email application 410-1 may enable the user to send and/or receive emails via UE 105. Telephone application 410-2 may enable the user to send and/or receive telephone calls via UE 105. Live event broadcasting application 410-3 may correspond to application 340 (FIG. 3) and may enable the user to access live event data 330 (FIG. 3) that is broadcast at an event location. Text messaging application 410-4 may enable a user to send and/or receive text messages via UE 105. As shown in FIG. 4A, the user may launch live event broadcasting application 410-3 by touching a screen of UE 105 and selecting live event broadcasting application 410-3.

When the user launches live event broadcasting application 410-3, user interface 400 depicted in FIG. 4B may be presented to the user. As shown in FIG. 4B, a welcome screen may be displayed to the user and may instruct the user to select a "live event available" icon 420 (or other selection mechanism) to view the live event. When the user moves to a location within the event location, UE 105 may detect that UE 105 is located within a broadcast system of the event location, and live event broadcasting application 410-3 may display "live event available" icon 420 on UE 105 to indicate that live event data 330 is available.

The user (via UE 105) may select "live event available" icon 420, and UE 105 may receive and display live event data 330 to the user, as shown in user interface 400 depicted in FIG. 4C. For example, if the user is attending a football game and has walked into the football stadium, user interface 400 of FIG. 4C may display the live football game to user. The live football game may be the same live broadcast that is being provided to television viewers capable of viewing the football game.

Although user interfaces 400 of FIGS. 4A-4C depict a variety of information, in other implementations, user interfaces 400 may depict less information, different information, differently arranged information, or additional information than depicted in FIGS. 4A-4C.

Figure 5:
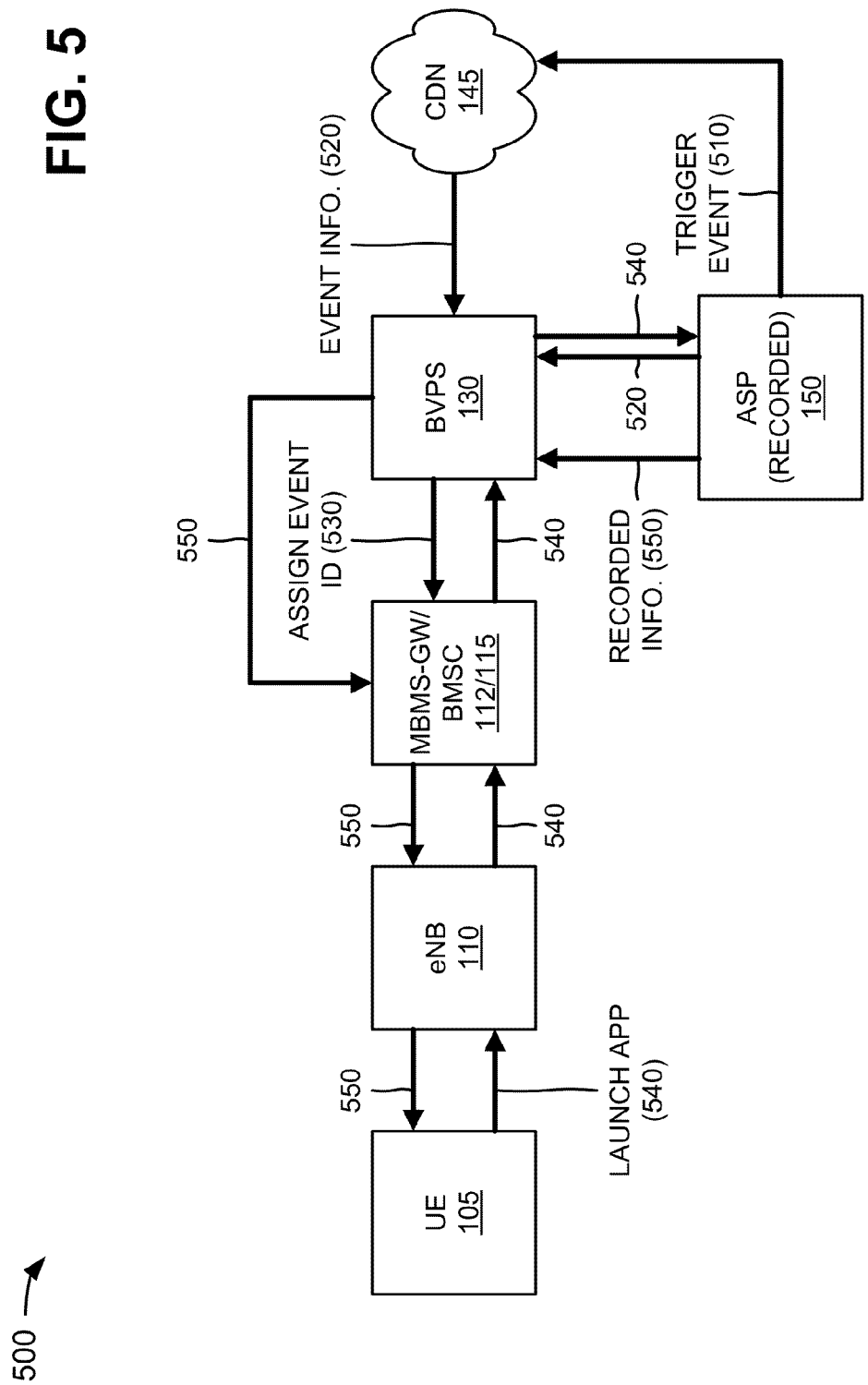
FIG. 5 is a diagram of example recorded event or data delivery operations capable of being performed by another example portion of the network in FIG. 1.

FIG. 5 is a diagram of example recorded event or data delivery operations capable of being performed by another example portion 500 of network 100 (FIG. 1). As shown, network portion 500 may include UE 105, eNB 110, MBMS-GW 112/BMSC 115, BVPS 130, CDN 145, and recorded ASP 150. UE 105, eNB 110, MBMS-GW 112/BMSC 115, BVPS 130, CDN 145, and recorded ASP 150 may include the features described above in connection with, for example, one or more of FIGS. 1-4C.

As further shown in FIG. 5, when an event is scheduled or available, recorded ASP 150 may provide, to CDN 145, a trigger 510 instructing CDN 145 to provide event information 520 to BVPS 130. Alternatively, or additionally, recorded ASP 150 may provide event information 520 directly to BVPS 130. Event information 520 may enable BVPS 130 to provision eNB 110 and MBMS-GW 112/BMSC 115 for a broadcast of a recorded event. Event information 520 may include a title of the recorded event, a duration of the recorded event, a start time of the recorded event, a stop time of the recorded event, and/or other information. For example, if the event is a recorded movie, event information 520 may include "Gone Like The Wind" as a title, "2 hours" as a duration, "On demand" as a start time, "2 hours after start time" as a stop time, etc.

BVPS 130 may receive event information 520, and may assign an event identifier (ID) 530 to the recorded event based on event information 520. BVPS 130 may store event ID 530 and corresponding event information 520 in a database associated with BVPS 130. The database may include information associated with all events to be broadcast by network 100 (FIG. 1). BVPS 130 may provide event ID 530 and the corresponding event information 520 to MBMS-GW 112/BMSC 115.

MBMS-GW 112/BMSC 115 may receive event ID 530 and the corresponding event information 520 from BVPS 130, and may advertise the recorded event to UE 105, via eNB 110 and based on event information 520. A user of UE 105 may launch an application 540 (e.g., provided on UE 105) that enables UE 105 to review recorded events advertised by MBMS-GW 112/BMSC 115 based on event information 520. Application 540 may enable the user to select and receive one of the recorded events advertised by MBMS-GW 112/BMSC 115. UE 105, via application 540, may request a particular recorded event from eNB 110, and eNB 110 may provide the request to MBMS-GW 112/BMSC 115. MBMS-GW 112/BMSC 115 may provide the request to BVPS 130, and BVPS 130 may provide the request to recorded ASP 150. Based on the request, recorded ASP 150 may provide recorded information 550, associated with the particular recorded event, to BVPS 130, and BVPS 130 may provide recorded information 550 to MBMS-GW 112/BMSC 115. Recorded information 550 may include multimedia (e.g., video, audio, data, etc.) associated with the particular recorded event. MBMS-GW 112/BMSC 115 may provide recorded information 550 to eNB 110, and eNB 110 may provide recorded information 550 to UE 105. UE 105 may receive and display recorded information 550 to the user.

In one example implementation, BMSC 115 may be made aware of recorded information 550 by BVPS 130 per a schedule associated with recorded information 550. The schedule may indicate that recorded information 550 is to be provided be in near real-time or after a period of time. BMSC 115 may provide, to CDN 145 and at a start time of the schedule, a request to begin acquiring recorded information 550. Once recorded information 550 is acquired, BVPS 130 may be alerted that recorded information 550 has been acquired and BMSC 115 may stream recorded information to UE 105, via eNB 110.

Although FIG. 5 shows example components of network portion 500, in other implementations, network portion 500 may include fewer components, different components, differently arranged components, or additional components than depicted in FIG. 5. Additionally, or alternatively, one or more components of network portion 500 may perform one or more other tasks described as being performed by one or more other components of network portion 500.

FIG. 6 is a diagram of a portion 600 of an example database capable of being provided in and/or managed by BVPS 130. As illustrated, database portion 600 may include a variety of information associated with live and recorded events. For example, database portion 600 may include an event identifier (ID) field 610, an event title field 620, a duration field 630, a location field 640, a start time field 650, a stop time field 660, a type field 670, and/or a variety of entries 680 associated with fields 610-670.

Event ID field 610 may include event IDs assigned by BVPS 130 to events. For example, event ID field 610 may include alphabetic, numeric, alphanumeric, or other types of identifiers for events. As shown in FIG. 6, event ID field 610 may include event IDs of "1," "2," "3," etc. for a first event, a second event, a third event, etc.

Event title field 620 may include titles of the events identified in event ID field 610. As shown in FIG. 6, the first event may include a title of "Football," the second event may include a title of "Movie," and the third event may include a title of "Concert."

Duration field 630 may include durations of the events identified in event ID field 610. For example, as shown in FIG. 6, the first event may include a duration of "3 hours," the second event may include a duration of "2 hours," and the third event may include a duration of "4 hours."

Location field 640 may include locations of the events identified in event ID field 610. As shown in FIG. 6, the first event may be located at "Camden," the second event may not be associated with a location (e.g., since the second event is a recorded movie), and the third event may be located at "NYC."

Start time field 650 may include start times of the events identified in event ID field 610. For example, as shown in FIG. 6, the first event may include a start time of "1:00 PM," the second event may not include a start time (e.g., since the second event is a recorded movie that may be viewed "On demand"), and the third event may include a start time of "7:00 PM."

Stop time field 660 may include stop times of the events identified in event ID field 610. For example, as shown in FIG. 6, the first event may include a stop time of "4:00 PM," the second event may not include a stop time (e.g., since the second event is a recorded movie that may be viewed "On demand"), and the third event may include a stop time of "11:00 PM."

Type field 670 may include types associated with the events identified in event ID field 610. As shown in FIG. 6, for example, the first event may be a "Live" event, the second event may be a "Recorded" event, and the third event may be a "Live" event.

Although FIG. 6 shows example information that may be provided in database portion 600, in other implementations, database portion 600 may contain less information, different information, differently arranged information, and/or additional information than depicted in FIG. 6.

Figure 7:
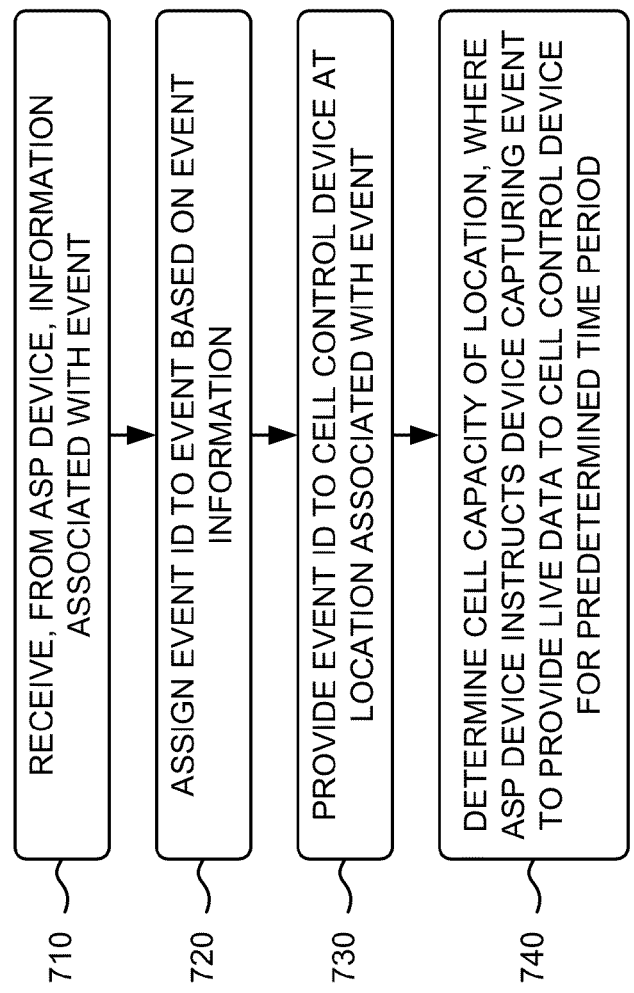
FIGS. 7 and 8 are flow charts of an example process for provisioning small cells for multimedia broadcast multicast services according to an implementation described herein.
Figure 8:
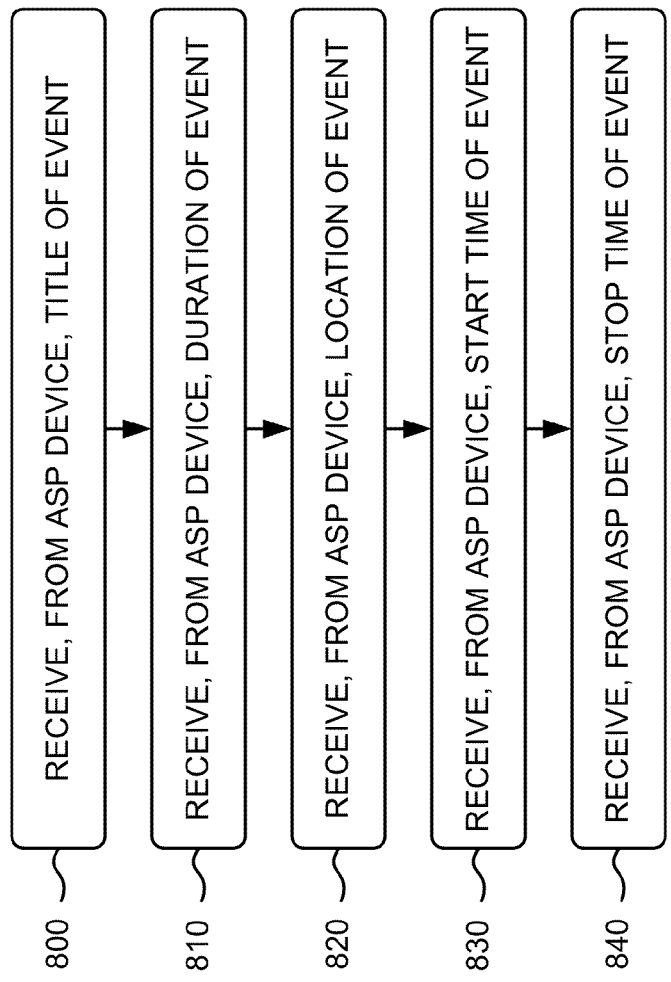

FIGS. 7 and 8 are flow charts of an example process 700 for provisioning small cells for multimedia broadcast multicast services according to an implementation described herein. In one implementation, process 700 may be performed by BVPS 130. Alternatively, or additionally, some or all of process 700 may be performed by another device or group of devices, including or excluding BVPS 130.

As shown in FIG. 7, process 700 may include receiving, from an ASP device, information associated with an event (block 710), and assigning an event identifier (ID) to the event based on the event information (block 720). For example, in an implementation described above in connection with FIG. 3, when an event is scheduled, live ASP 135 may provide event information 310 to BVPS 130 for provisioning eNB 110 and MBMS-GW 112/BMSC 115 for a broadcast of the event. Event information 310 may include a title of the event, a duration of the event, a location of the event, a start time of the event, a stop time of the event, whether the event is live or recorded, and/or other information. BVPS 130 may receive event information 310, and may assign event identifier (ID) 320 to the event based on event information 310. BVPS 130 may store event ID 320 and corresponding event information 310 in a database associated with BVPS 130. The database may include information associated with all events to be broadcast by network 100.

As further shown in FIG. 7, process 700 may include providing the event ID to a cell control device at a location associated with the event (block 730), and determining a cell capacity of the location, where the ASP device instructs a device capturing the event to provide live data to the cell control device for a predetermined time period (block 740). For example, in an implementation described above in connection with FIG. 3, live ASP 135 may also provide event information 310 to live event device 125. Event information 310 may instruct live event device 125 to provide live event data to MBMS-GW 112/BMSC 115 when the event begins and for a predetermined time period (e.g., the duration of the event). BVPS 130 may provide event ID 320 and the corresponding event information 310 to MBMS-GW 112/BMSC 115, and may determine a cell capacity of eNB 110 at the event location. In one example, BVPS 130 may determine the cell capacity of eNB 110 to ensure that there is sufficient cell capacity to broadcast the event to eNB 110. When the event begins, live event device 125 may capture and broadcast live event data 330 to MBMS-GW 112/BMSC 115 based on event information 310 and for a predetermined time period (e.g., the duration of the live event). Live event data 330 may include multimedia (e.g., video, audio, data, etc.) captured by live event device 125 at the event location. MBMS-GW 112/BMSC 115, in turn, may broadcast live event data 330 to eNBs 110 provided at the event location.

Process block 710 may include the process blocks depicted in FIG. 8. As shown in FIG. 8, process block 710 may include receiving, from the ASP device, a title of the event (block 800), receiving, from the ASP device, a duration of the event (block 810), receiving, from the ASP device, a location of the event (block 820), receiving, from the ASP device, a start time of the event (block 830), and/or receiving, from the ASP device, a stop time of the event (block 840). For example, in an implementation described above in connection with FIG. 3, when an event is scheduled, live ASP 135 may provide event information 310 to BVPS 130 for provisioning eNB 110 and MBMS-GW 112/BMSC 115 for a broadcast of the event. Event information 310 may include a title of the event, a duration of the event, a location of the event, a start time of the event, a stop time of the event, whether the event is live or recorded, and/or other information. BVPS 130 may receive event information 310.

Figure 9:
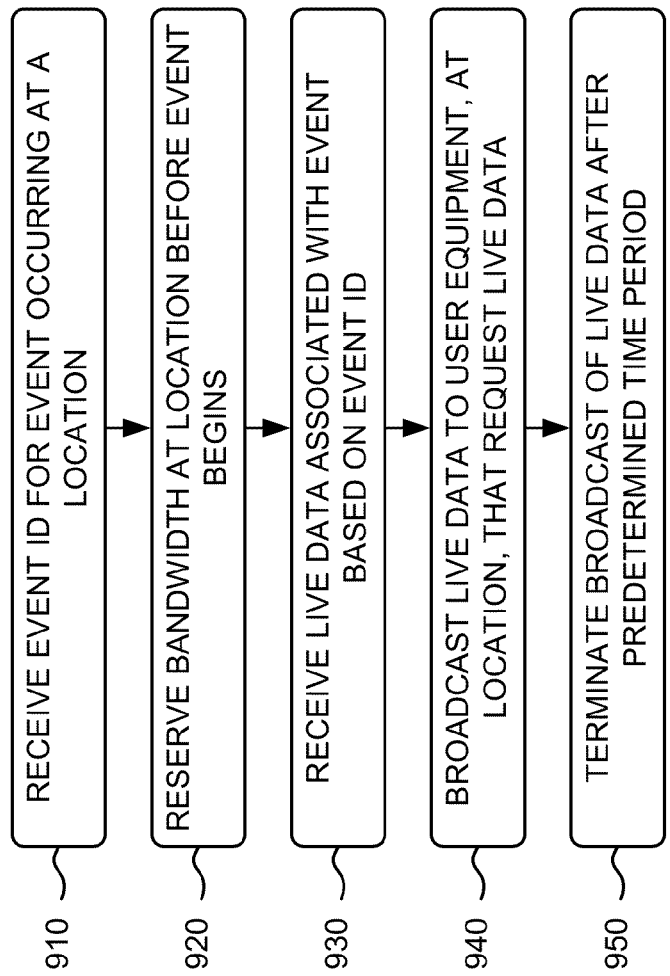
FIG. 9 is a flow chart of an example process for providing multimedia broadcast multicast services to a UE according to an implementation described herein.

FIG. 9 is a flow chart of an example process 900 for providing multimedia broadcast multicast services to a UE according to an implementation described herein. In one implementation, process 900 may be performed by BMSC 115. Alternatively, or additionally, some or all of process 900 may be performed by another device or group of devices, including or excluding BMSC 115.

As shown in FIG. 9, process 900 may include receiving an event identifier (ID) for an event occurring at a location (block 910), and reserving bandwidth at the location before the event begins (block 920). For example, in an implementation described above in connection with FIG. 3, MBMS-GW 112/BMSC 115 may receive event ID 320 and the corresponding event information 310 from BVPS 130, and may identify when the event begins based on event information 310. Based on event information 310, MBMS-GW 112/BMSC 115 may reserve bandwidth at the event location (e.g., at eNB 110) before the event begins. For example, MBMS-GW 112/BMSC 115 may instruct eNB 110 to reserve bandwidth in preparation for the beginning of the event.

In one example implementation, BVPS 130 may instruct eNB 110 to reserve bandwidth at the event location by issuing commands (e.g., a START event command), which may result in a set of control signaling of the event through BMSC 115, MBMS-GW 112, a mobility management entity (MME), and eNB 110. The control signaling may trigger eNB 110 to create a dedicated bearer (e.g., a guaranteed bit rate bearer) with a quality of service class indicator (QCI). This process may be repeated for each multimedia content to be delivered through eNB 110 or pool of eNBs 110.

As further shown in FIG. 9, process 900 may include receiving live data, associated with the event, based on the event ID (block 930), and broadcasting the live data to user equipment, at the location, that request the live data (block 940). For example, in an implementation described above in connection with FIG. 3, when the event begins, live event device 125 may capture and broadcast live event data 330 to MBMS-GW 112/BMSC 115 based on event information 310. Live event data 330 may include multimedia (e.g., video, audio, data, etc.) captured by live event device 125 at the event location. MBMS-GW 112/BMSC 115, in turn, may broadcast live event data 330 to eNBs 110 provided at the event location. A user of UE 105 may launch application 340 (e.g., provided on UE 105) that enables UE 105 to request and receive live event data 330 when UE 105 is located within the event location. UE 105, via application 340, may request live event data 330 from eNB 110, and eNB 110 may provide live event data 330 to UE 105 based on the request. In one example, the user may launch application 340, and may move to a location within the event location. When UE 105 detects that UE 105 is located within a broadcast system of the event location, application 340 may display "live event" information on UE 105 to indicate that live event data 330 is available. The user (via UE 105) may select the "live event" information, and UE 105 may receive and display live event data 330 to the user.

Returning to FIG. 9, process 900 may include terminating the broadcast of the live data after a predetermined time period (block 950). For example, in an implementation described above in connection with FIG. 3, BMSC 115 may broadcast live event data 330 to UE 105 for a predetermined time period (e.g., the duration of the live event), and may terminate the broadcast of live event data 330 after the predetermined time period.

Figure 10:
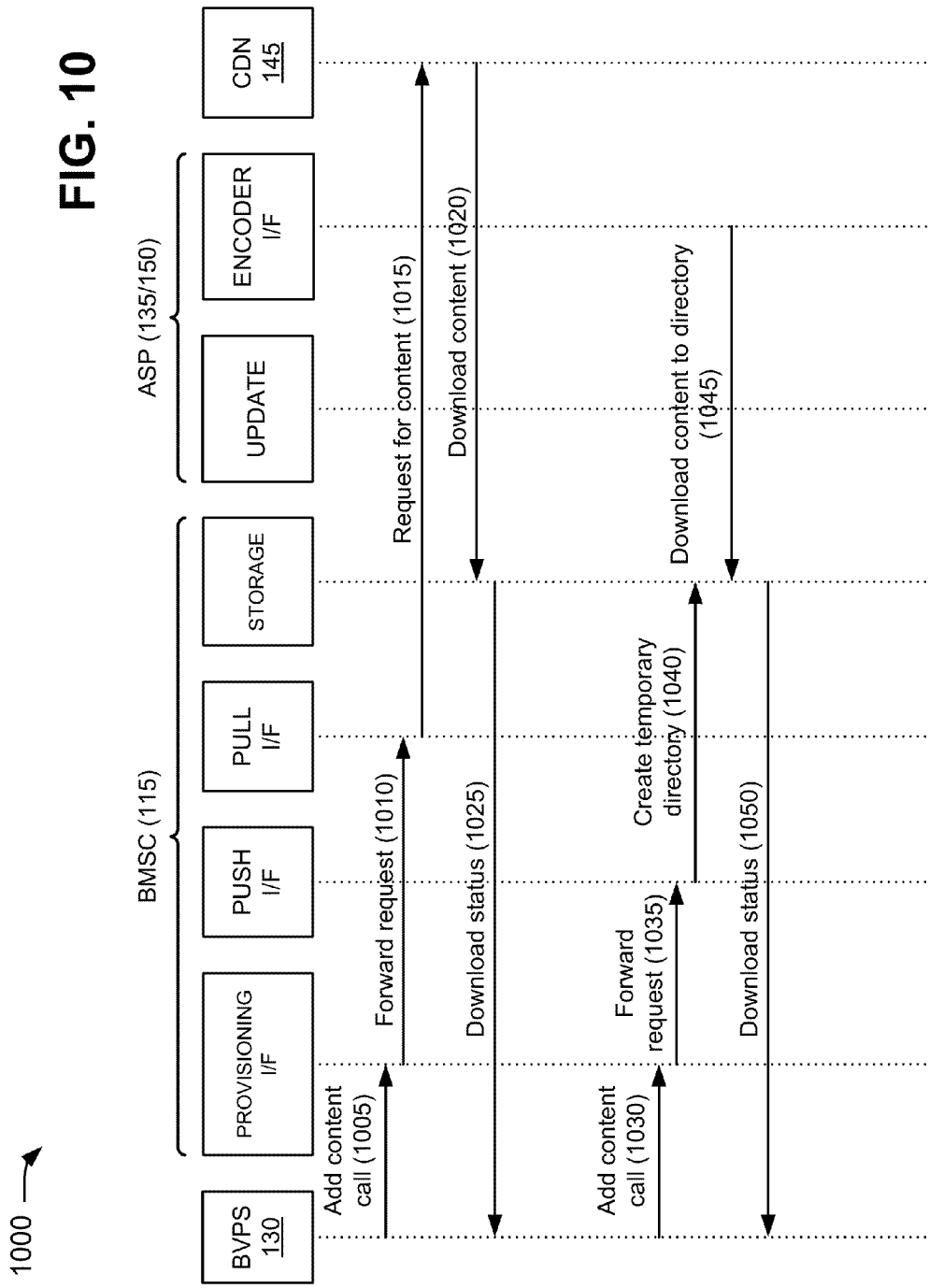
FIG. 10 is an example call flow diagram for content ingestion by the BVPS and a broadcast multicast service control (BMSC) of FIG. 1.

FIG. 10 is an example call flow diagram 1000 for content ingestion by BVPS 115 and BMSC 115. As shown, BVPS 130 may provide an add content API call to a provisioning interface (I/F) of BMSC 115 (block 1005). The add content API call may include content template parameters, such as a Uniform Resource Identifier (URI), a PULL interface, etc. The provisioning interface of BMSC 115 may identify a PULL interface of BMSC 115, and may forward the content request to the PULL interface (block 1010). The PULL interface of BMSC 115 may provide a request for content to CDN 145 using a secure connection (block 1015). BMSC 115 may then begin to download the content to storage of BMSC 115, via an encoder interface of ASP 135/150 (block 1020). The storage of BMSC 115 may provide a content download status to BVPS 130 and may alert BVPS 130 when the download is complete (block 1025). In one example, blocks 1005-1025 may depict file download operations.

As further shown in FIG. 10, BVPS 130 may provide an add content API call to the provisioning interface of BMSC 115 (block 1030). The add content API call may include content template parameters, such as a URI, a PUSH interface, a directory, etc. The provisioning interface of BMSC 115 may identify a PUSH interface of BMSC 115, and may forward the content request to the PUSH interface (block 1035). The PUSH interface of BMSC 115 may create a temporary directory, based on the content template, in the storage of BMSC 115 (block 1040). BMSC 115 may then begin to download the content to the temporary directory provided in the storage of BMSC 115, via the encoder interface of the ASP 135/150 (block 1045). The storage of BMSC 115 may provide a content download status to BVPS 130 and may alert BVPS 130 when the download is complete (block 1050). In one example, blocks 1030-1050 may depict live linear video download operations.

Figure 11:
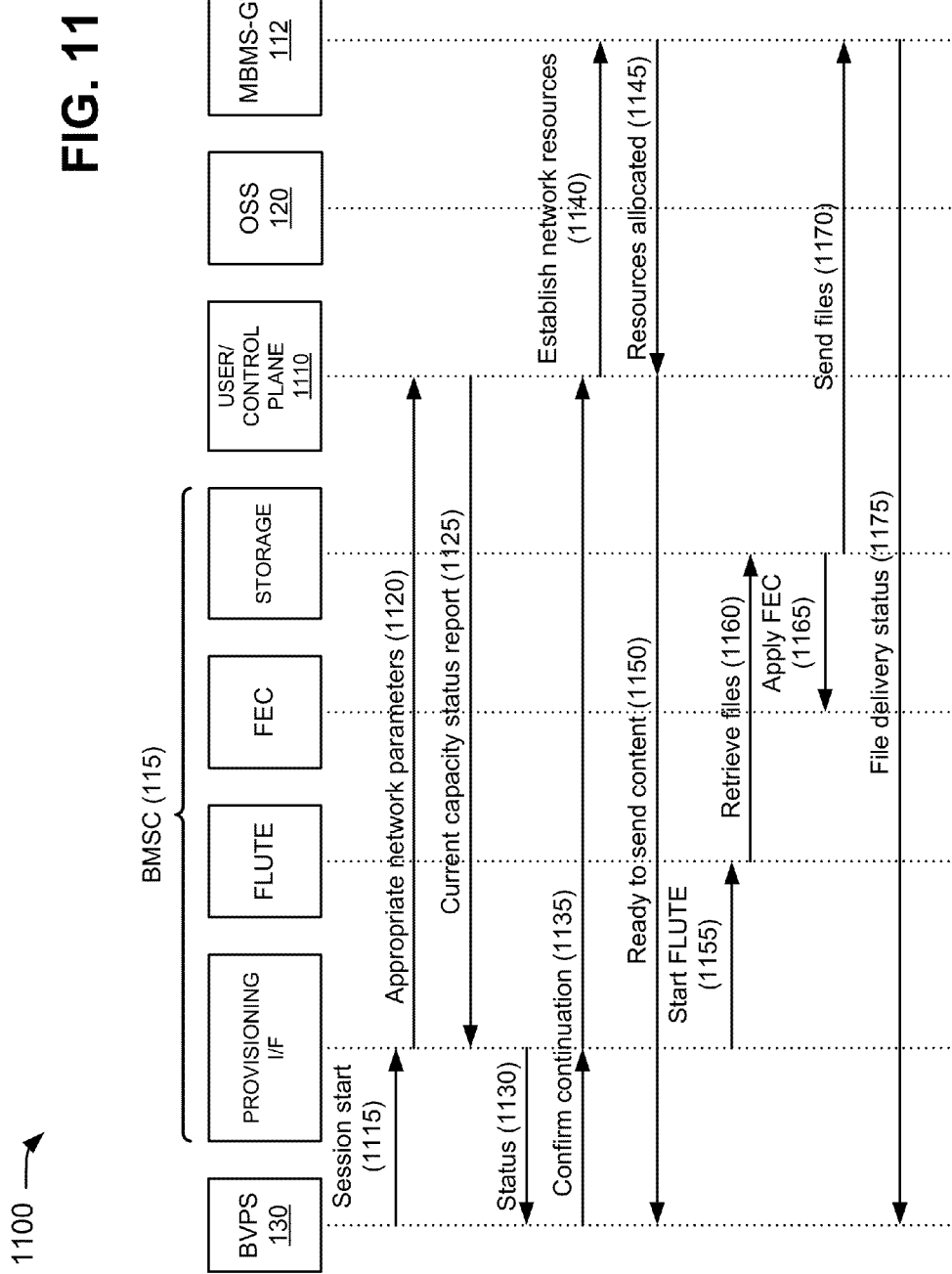
FIG. 11 is an example call flow diagram for content delivery by the BVPS and the BMSC of FIG. 1.

FIG. 11 is an example call flow diagram 1100 for content delivery by BVPS 130 and BMSC 115. As shown, BVPS 130 may provide an eMBMS session start command to a provisioning interface of BMSC 115 (block 1115). The session start command may include service area and network template parameters, such as a service area identifier (ID), a guaranteed bit rate (GBR), etc. The provisioning interface of BMSC 115 may provide appropriate network parameters to a user/control plane 1110 to establish a bearer (block 1120). User/control plane 1110 may report a status of the current network capacity and health to provisioning interface of BMSC 115 (block 1125), and the provisioning interface may provide the status to BVPS 130 (block 1130). BVPS 130 may confirm continuation of the content delivery with user/control plane 1110 (block 1135), and user/control plane 1110 may establish the required network resources to start the eMBMS session with MBMS-GW 112 (block 1140).

As further shown in FIG. 11, MBMS-GW 112 may allocate the network resources (block 1145), and user/control plane 1110 may inform BVPS 130 that content is ready to be delivered to BVPS 130 (block 1150). The provisioning interface of BMSC 115 may begin a FLUTE session (block 1155), and BMSC 115 may retrieve files from storage (block 1160) and apply forward error correction (FEC) to the retrieved files (block 1165). BMSC 115 may send files from the storage to MBMS-GW 112 (block 1170). MBMS-GW 112 may provide a file delivery status to BVPS 130 and may alert BVPS 130 when the file delivery is complete (block 1175).

Figure 12:
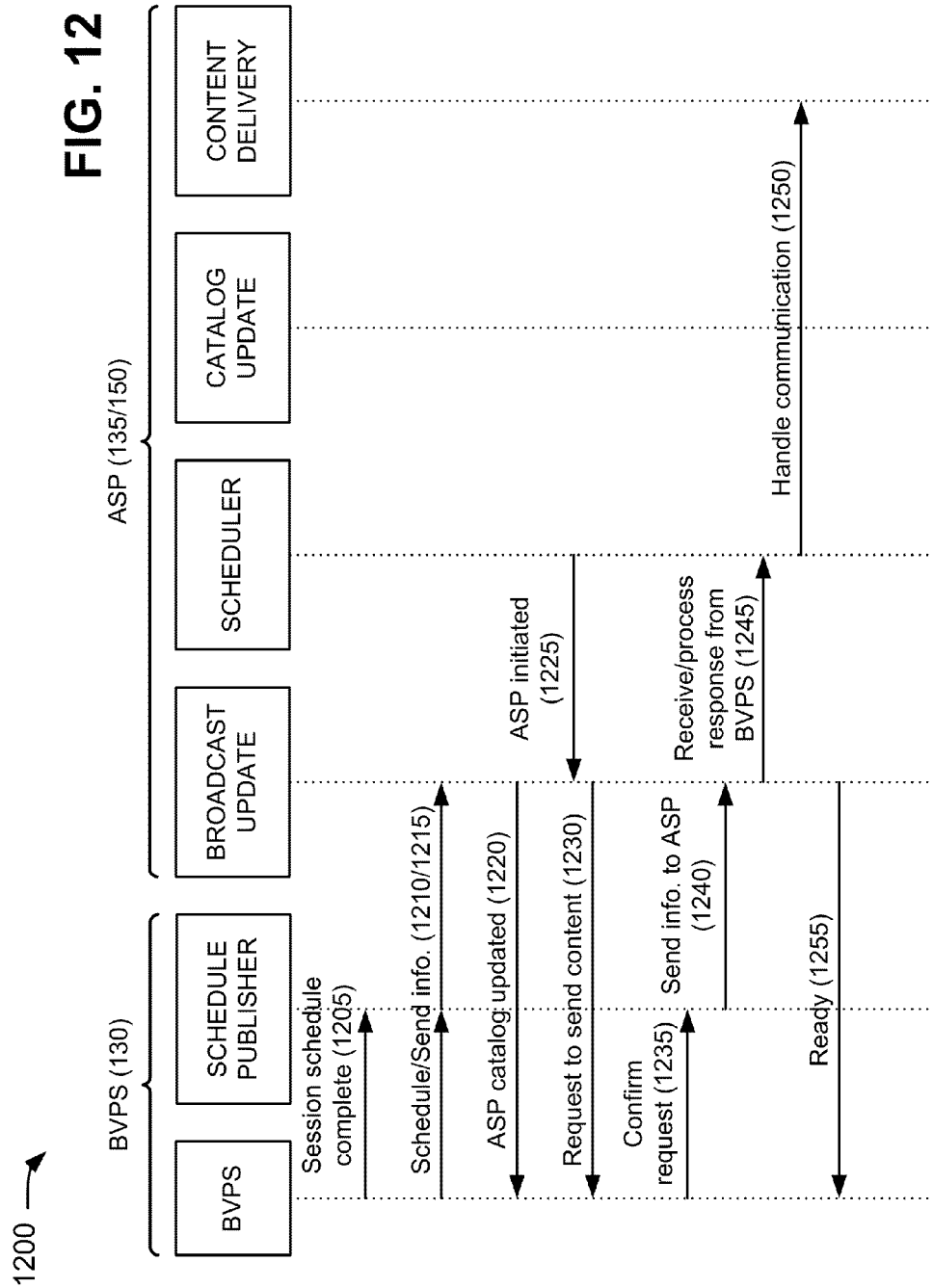
FIG. 12 is a diagram of an example call flow between the BVPS and an application service provider (ASP) of FIG. 1.

FIG. 12 is a diagram of an example call flow 1200 between BVPS 130 and ASP 135/150. As shown, a session schedule may be completed by a user and sent to a schedule publisher of BVPS 130. BVPS 130 may create schedule information and may send the schedule information to the schedule publisher (block 1210). The schedule publisher may send the schedule information to a broadcast update handler of ASP 135/150 (block 1215). ASP 135/150 may parse the schedule information and may populate a catalog for live broadcast. ASP 135/150 may provide the parsed schedule information to a scheduler, and the scheduler may generate a confirmation that the session has been successfully scheduled. The broadcast update handler may provide, to BVPS 130, an indication that the ASP catalog has been successfully updated (block 1220).

As further shown in FIG. 12, the scheduler of ASP 135/150 may initiate the broadcast update handler (block 1225), and the broadcast update handler may provide, to BVPS 130, a request to sent content over broadcast (block 1230). BVPS 130 may confirm the request (block 1235), and the schedule publisher of BVPS 130 may send information regarding the confirmation to the broadcast update handler of ASP 135/150 (block 1240). The scheduler of ASP 135/150 may receive and process the response from BVPS 130 (block 1245), and may handle communication with an encoder (block 1250). The broadcast update handler of ASP 135/150 may provide, to BVPS 130, an indication that ASP 135/150 is ready to broadcast the content (block 1255).

Figure 13:
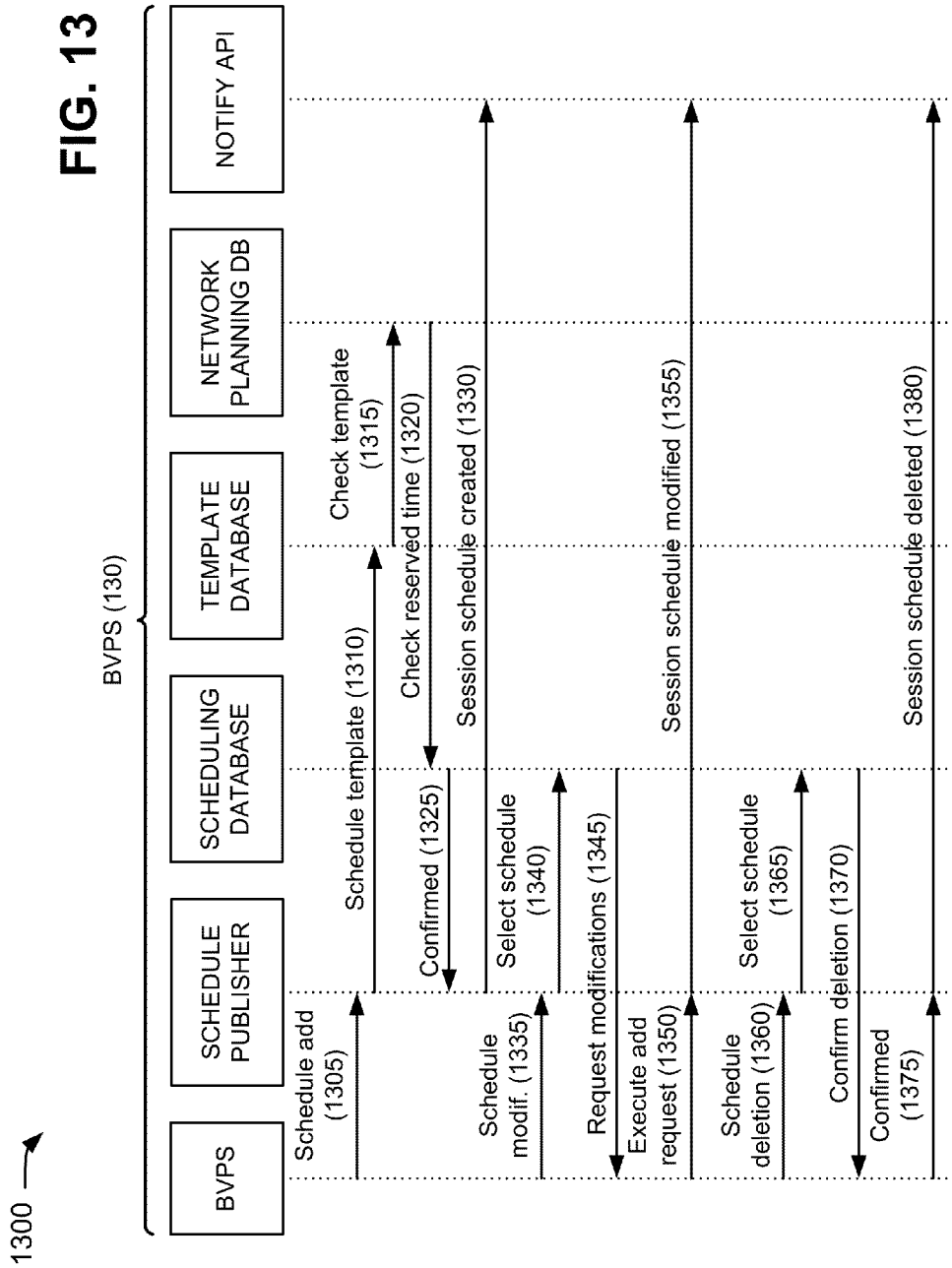
FIG. 13 is an example BVPS scheduling call flow diagram.

FIG. 13 is an example BVPS 130 scheduling call flow diagram 1300. As shown, BVPS 130 may schedule an add request with a schedule publisher (block 1305), and the schedule publisher may select a template from a template database (block 1310). The template database may check planning information associated with the selected template via a network planning database (block 1315). The network planning database may reserve network resource allocation for the selected template and may check with a scheduling database for a reserved time (block 1320). The scheduling database may confirm the reserved time with the schedule publisher (block 1325), and the schedule publisher may provide a session schedule created alert to a notify API (block 1330). In one example, blocks 1305-1330 may depict operations for adding a scheduled event.

As shown in FIG. 14, the service area template may include a service area name field 1410, a service area ID field 1420, a cell ID field 1430, a location field 1440, a distributed network field 1450, a Temporary Mobile Group Identities (TMGIs) field 1460, and a variety of entries 1470 associated with fields 1410-1460. Service area name field 1410 may include names of service areas associated with event locations. Service area ID field 1420 may include identifiers associated with the event locations. Cell ID field 1430 may include cell IDs associated with the event locations. Location field 1440 may include locations (e.g., in latitude and longitude) associated with the events. Distributed network field 1450 may include flags indicative of whether networks associated with the event locations are distributed. TMGIs field 1460 may include TMGIs associated with the event locations.

As also shown in FIG. 13, BVPS 130 may schedule a deletion request with the schedule publisher (block 1360), and the schedule publisher may select a schedule to be deleted from the scheduling database (block 1365). The scheduling database may delete the schedule and may provide confirmation of the deletion to BVPS 130 (block 1370). BVPS 130 may confirm the schedule deletion with schedule publisher (block 1375), and the schedule publisher may provide a session schedule deleted alert to the notify API (block 1380). In one example, blocks 1360-1380 may depict operations for deleting a scheduled event.

In one example implementation, BVPS 130 may utilize pre-defined templates to build eMBMS sessions and associated delivery sessions. For example, BVPS 130 may utilize a service area template, a network template, a content template, etc. Users of BVPS 130 may alter, maintain, and/or manage these templates via a graphical user interface (GUI), a shell, command line interface (CLI) scripting, etc. FIG. 14 is a diagram of a portion 1400 of an example service area template capable of being provided in and/or managed by BVPS 130. The service area template may define and identify cells and a geographic location associated with a MBSFN area associated with a service.

As shown in FIG. 14, the service area template may include a service area name field 1410, a service area ID field 1420, a cell ID field 1430, a location field 1440, a distributed network field 1450, a Temporary Mobile Group Identities (TMGIs) field 1460, and a variety of entries 1470 associated with fields 1410-1460. Service area name field 1410 may include names of service areas associated with event locations. Service area ID field 1420 may include identifiers associated with the event locations. Cell ID field 1430 may include cell IDs associated with the event locations. Location field 1440 may include locations (e.g., in latitude and longitude) associated with the events. Distributed network field 1450 may include flags indicated whether networks associated with the event locations are distributed. TMGIs field 1460 may include TMGIs associated with the event locations.

FIG. 15 is a diagram of a portion 1500 of an example network template capable of being provided in and/or managed by BVPS 130. The network template may be automatically populated from a network planning database that provides network provisioning parameters and network inventory. The network template may be populated in advance of eMBMS service planning, such as during site planning phases. The network template may define a MBSFN area. Every MBSFN area may include parameters that characterize resources allocated across a specific service area.

As shown in FIG. 15, the network template may include a MBSFN name field 1510, a MBSFN ID field 1520, a percentage subframes field 1530, a MCS value field 1540, a FEC value field 1550, a GBR field 1560, a maximum video bandwidth field 1570, an overrides field 1580, and a variety of entries 1590 associated with fields 1510-1580. MBSFN name field 1510 may include names associated with MBSFNs utilized by BVPS 130. MBSFN ID field 1520 may include identifiers associated with the MBSFNs listed in MBSFN name field 1510. Percentage subframes field 1530 may include percentages of subframes used by the MBSFNs listed in MBSFN name field 1510. MCS value field 1540 may include multicast server (MCS) values used by the MBSFNs listed in MBSFN name field 1510. FEC value field 1550 may include FEC values used by the MBSFNs listed in MBSFN name field 1510. GBR field 1560 may include GBRs used by the MBSFNs listed in MBSFN name field 1510. Maximum video bandwidth field 1570 may include maximum video bandwidths used by the MBSFNs listed in MBSFN name field 1510. Overrides field 1580 may include indications of whether the MBSFNs provide override functionality.

FIG. 16 is a diagram of a portion 1600 of an example content template capable of being provided in and/or managed by BVPS 130. As shown, the content template may include a file name field 1610, a content ID field 1620, a URI field 1630, an ASP name field 1640, a source interface field 1650, an encode field 1660, a bit rate field 1670, a user datagram protocol (UDP) field 1680, and a variety of entries 1690 associated with fields 1610-1680. File name field 1610 may include file names associated with content to be delivered. Content ID field 1620 may include identifiers associated with the content to be delivered. URI field 1630 may include URIs associated with the content to be delivered. ASP name field 1640 may include ASPs associated with the content to be delivered. Source interface field 1650 may include source interfaces associated with the content to be delivered. Encode field 1660 may include encoding associated with the content to be delivered. Bit rate field 1670 may include bit rates associated with the content to be delivered. UDP field 1680 may include UDPs associated with the content to be delivered.

Figure 17:
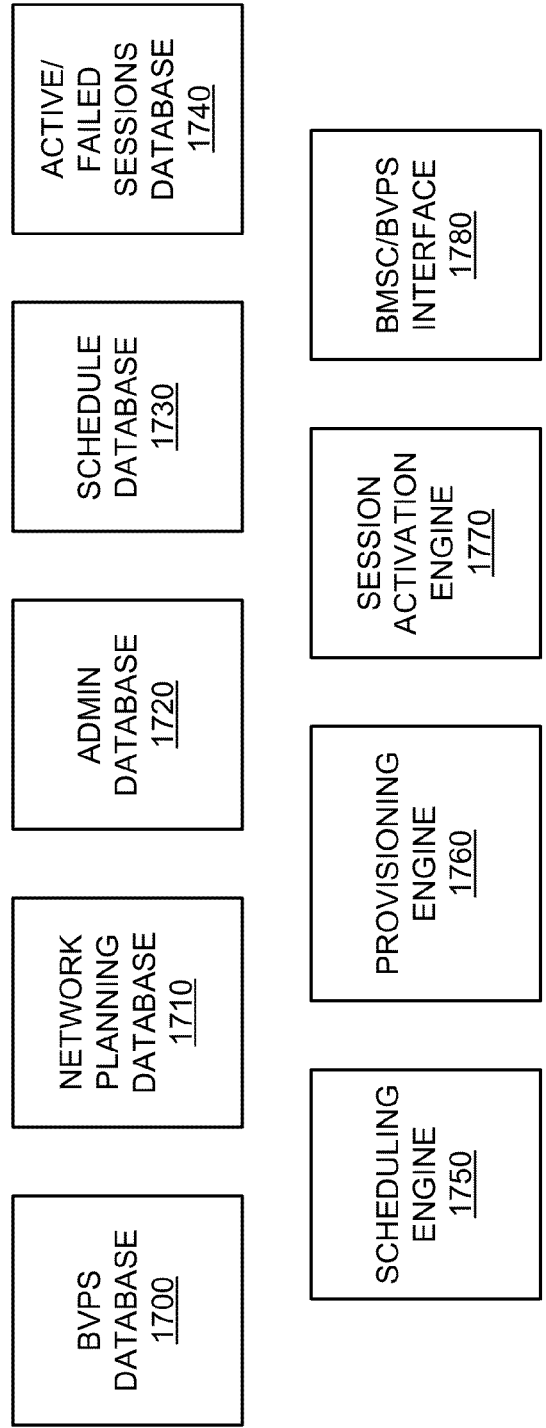
FIG. 17 is a diagram of example functional components of the BVPS of FIG. 1.

FIG. 17 is a diagram of example functional components of BVPS 130. In one implementation, the functions described in connection with FIG. 17 may be performed by one or more components of device 200 (FIG. 2) or by one or more devices 200. As shown in FIG. 17, BVPS 130 may include a BVPS database 1700, a network planning database 1710, an administrative database 1720, a schedule database 1730, an active/failed sessions database 1740, a scheduling engine 1750, a provisioning engine 1760, a session activation engine 1770, and a BMSC/BVPS interface 1780.

Operators of BVPS 130 may input eMBMS template information (e.g., manually or import from sources) to BVPS database 1700. Network planners may plan cell sites and may provide information associated with the cell sites into network planning database 1710. Network planning database 1710 may share such information with BVPS database 1700. Operators may select appropriate templates from the eMBMS template information stored in BVPS database 1700, and the selected templates may be provided to scheduling engine 1750. Scheduling engine 1750 may correlate information from BVPS database 1700 with the selected templates. Scheduling engine 1750 may create a scheduling record based on the selected templates, and may provide the scheduling record to schedule database 1730. Scheduling records may be viewable by operators of BVPS 130, via a BVPS session scheduling screen.

Scheduling engine 1750 may initialize provisioning engine 1760 if there are no scheduling conflicts and if it is time to start the eMBMS session. Provisioning engine 1760 may pull appropriate data from BVPS database 1700 to set up the eMBMS session. Provisioning engine 1760 may use BMSC/BVPS interface 1780 to create the session and to check capacity. BMSC 115 may provide a "go" or "no go" message to provisioning engine 1760. Provisioning engine 1760 may catalog a success or a failure in active/failed sessions database 1740. Active and failed session setups may be viewed by an operator of BVPS 130 via a sessions manager screen. Provisioning engine 1760 may initialize session activation engine 1770 if BMSC 115 has reported no network issues. Session activation engine 1770 may pull the appropriate data from BVPS database 1700 to set up the delivery session.

Session activation engine 1770 may use BMSC/BVPS interface 1780 to create the delivery session. BMSC 115 may send a "go" "no go" message and an associated URI to session activation engine 1770. Session activation engine 1770 may catalog the success or failure in active/failed sessions database 1740. BMSC/BVPS interface 1780 may query BMSC 115 for Session Description Protocol (SDP) files, and BMSC 115 can send the SDP file information to BVPS 130. BMSC/BVPS interface 1780 may publish or notify an ASP that a USD file is ready for distribution. BVPS administrative database 1720 may allow operators to maintain access privileges and BVPS modules.

In one example implementation, BVPS 130 may permit operators of BVPS 130 to add, remove, or modify service area templates, network templates, and/or content templates. With regard to scheduling, BVPS 130 may permit operators to add, remove, or modify MBMS sessions by applying a combination of service area and network templates and manual parameters. BVPS 130 may permit operators to see an active, a pending, and a historical session database. BVPS 130 may assign an auto-generated and unique session ID value to every scheduled MBMS Session. BVPS 130 may permit operators to input a session name for a MBMS session, and may confirm a schedule with an operator before putting the schedule into active/failed sessions database 1740.

With regard to capacity allocation, BVPS 130 may use network templates and real-time time network conditions to allocate capacity. BVPS 130 may lock capacity allocation once a session is scheduled and may alert an operator of potential conflicts. BVPS 130 may permit operators to override a capacity allocation if the network template allows for it.

Systems and/or methods described herein may provide a network device that provisions small cells for eMBMS, such as video broadcast multicast services. This may be achieved by dynamically configuring an access network to an eMBMS single frequency network (MBSFN), where the multiple small cells broadcast the same information with network known parameters, schedule, and service area for content delivery. The small cells may be reserved on an opportunistic basis, such as when an event is about to occur, and may be reserved for a specified period of time, such as the duration of the event. Once the event is over, the systems and/or methods may provision the small cells for unicast service. The event may include a regional event, a national event, a live event, a recorded event, data delivery, etc. The systems and/or methods may provision small cells for eMBMS across multiple regions, and may provision different small cells with different bandwidth feeds for eMBMS.

The foregoing description of implementations provides illustration and description, but is not intended to be exhaustive or to limit the implementations to the precise form disclosed. Modifications and variations are possible in light of the above teachings or may be acquired from practice of the implementations.

For example, while series of blocks have been described with regard to FIGS. 7-9, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
    receiving, by a server device and from a network device, information associated with an event;
    using the event information and a stored template to identify multiple small cells and a geographic location associated with an evolved multimedia broadcast multicast services (eMBMS) single frequency network (MBSFN);
    assigning, by the server device, an event identifier to the event based on the event information;
    providing, by the server device, the event identifier to a cell control device located at a location associated with the event;
    determining, by the server device, a cell capacity of the multiple small cells at the geographic location to ensure that there is sufficient cell capacity at the location associated with the event to broadcast the event to a plurality of user devices associated with attendees at the event, via an eMBMS session;
    configuring an access network to the MBSFN, wherein the network device instructs a device capturing multimedia content at the event to provide live event data to the cell control device for a predetermined time period; and
    provisioning, at an expiration of the predetermined time period, the multiple small cells for unicast service with respect to the plurality of user devices.

2. The method of claim 1, further comprising:
    storing the event identifier and the event information in a database associated with the server device.

3. The method of claim 1, wherein receiving the event information includes receiving:
    a title of the event,
    a duration of the event,
    the location of the event,
    a start time of the event, and
    a stop time of the event.

4. The method of claim 3, wherein capturing multimedia content at the event includes capturing video, audio, and data content at the event to provide live event data to the cell control device for the duration of the event.

5. The method of claim 1, wherein receiving information associated with the event includes receiving information associated with one of:
    a live national event, or
    a live regional event.

6. The method of claim 1, wherein receiving information associated with the event includes receiving information associated with one of:
    a live sporting event,
    a live concert, or
    a live speech.

7. The method of claim 1, wherein the network device instructs the device capturing the multimedia content at the event to provide live event data to the cell control device in response to the plurality of user devices requesting the live event data at the location associated with the event.

8. A server device, comprising:
    a processor configured to:
        receive, from a network device, information associated with an event,
        use the event information and a stored template to identify multiple small cells and a geographic location associated with an evolved multimedia broadcast multicast services (eMBMS) single frequency network (MBSFN),
        assign an event identifier to the event based on the event information,
        provide the event identifier to a cell control device located at a location associated with the event,
        determine a cell capacity of the multiple small cells at the geographic location to ensure that there is sufficient cell capacity at the location associated with the event to broadcast the event, to a plurality of user devices associated with attendees at the event, via an eMBMS session,
        configure an access network to the MBSFN, wherein the network device instructs a device capturing multimedia content at the event to provide live event data to the cell control device for a predetermined time period, and
        provision, at an expiration of the predetermined time period, the multiple small cells for unicast service with respect to the plurality of user devices.

9. The server device of claim 8, wherein the processor is further configured to:
    store the event identifier and the event information in a database associated with the server device.

10. The server device of claim 8, wherein the event information includes:
a title of the event,
a duration of the event,
the location of the event,
a start time of the event, and
a stop time of the event.

11. The server device of claim 8, wherein the predetermined time period includes a duration of the event.

12. The server device of claim 8, wherein the event includes one of:
a live event,
a recorded event, or
a data delivery.

13. The server device of claim 8, wherein the network device instructs the device capturing the multimedia content at the event to provide live event data to the cell control device responsive to the plurality of user devices requesting the live event data at the location associated with the event.

14. A method, comprising:
receiving, by a server device, an event identifier for an event occurring at a venue location for accommodating a plurality of attendees of the event;
reserving, by the server device, bandwidth at the venue location for user equipment associated with the attendees of the event and before the event begins at the venue location;
receiving, by the server device and based on the event identifier, live data captured at the event at the venue location;
configuring an access network to an evolved multimedia broadcast multicast services (eMBMS) single frequency network (MBSFN) to provision multiple small cells at the venue location for an eMBMS session;
broadcasting, by the server device and using the reserved bandwidth, the live data to a user equipment at the venue location, in response to requests for the live data, via the eMBMS session;
terminating, by the server device, the eMBMS session after a predetermined time period corresponding to an ending of the event at the venue location; and
provisioning, based on the terminating, the multiple small cells for unicast service with respect to the user equipment at the venue location.

15. The method of claim 14, wherein terminating the eMBMS session after the predetermined time period includes terminating the eMBMS session after a duration of the event.

16. The method of claim 14, wherein receiving an event identifier for an event comprises receiving an event identifier for one of:
a live sporting event,
a live concert, or
a live speech.

17. The method of claim 14, wherein receiving live data captured at the event includes receiving live data associated with one of:
a live national event, or
a live regional event.

18. The method of claim 14, wherein a network device instructs a device capturing the event to provide the live data to the server device when the user equipment, requesting the live data, moves to the venue location.

19. A server device, comprising:
a processor configured to:
receive an event identifier for an event occurring at a venue location for accommodating a plurality of attendees of the event,
reserve, before the event begins at the venue location, bandwidth at the venue location for user equipment associated with the attendees of the event,
receive, based on the event identifier, live data captured at the event at the venue location,
configure an access network to an evolved multimedia broadcast multicast services (eMBMS) single frequency network (MBSFN) to provision multiple small cells at the venue location for an eMBMS session,
broadcast, using the reserved bandwidth, the live data to the user equipment at the venue location, in response to requests for the live data, via an eMBMS session,
terminate the eMBMS session after a predetermined time period corresponding to an ending of the event at the venue location, and
provision, based on the termination, the multiple small cells for unicast service with respect to the user equipment at the venue location.

20. The server device of claim 19, wherein the predetermined time period includes a duration of the event.

21. The server device of claim 19, wherein the event includes one of:
a live national event, or
a live regional event.

22. The server device of claim 19, wherein a device capturing the event is instructed to provide the live data to the server device when the user equipment, requesting the live data, moves to the venue location.

\* \* \* \* \*